(12) United States Patent
Rosland

(10) Patent No.: US 10,547,677 B1
(45) Date of Patent: Jan. 28, 2020

(54) SYSTEM FOR DATA STORAGE FOR DISTRIBUTED ACCESS

(71) Applicant: EMC IP Holding Company LLC, Hopkinton, MA (US)

(72) Inventor: Jonas Rosland, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 813 days.

(21) Appl. No.: 14/673,686

(22) Filed: Mar. 30, 2015

(51) Int. Cl.
| | | |
|---|---|---|
| *G06F 7/00* | (2006.01) | |
| *H04L 29/08* | (2006.01) | |
| *G06F 21/62* | (2013.01) | |
| *G06F 16/27* | (2019.01) | |

(52) U.S. Cl.
CPC .......... *H04L 67/1095* (2013.01); *G06F 16/27* (2019.01); *G06F 21/6218* (2013.01); *G06F 2221/2141* (2013.01)

(58) Field of Classification Search
CPC ............................................. G06F 2221/2141
USPC ......................................................... 707/698
See application file for complete search history.

(56) References Cited

U.S. PATENT DOCUMENTS

| | | | | | |
|---|---|---|---|---|---|
| 5,526,517 | A | * | 6/1996 | Jones ...................... | G06F 17/50 707/999.008 |
| 6,609,128 | B1 | * | 8/2003 | Underwood ............ | G06F 9/454 707/610 |
| 7,100,195 | B1 | * | 8/2006 | Underwood ............ | G06F 9/451 726/2 |
| 7,460,476 | B1 | * | 12/2008 | Morris .............. | H04W 72/1242 370/230.1 |
| 10,311,121 | B2 | * | 6/2019 | Skinder ............... | G06F 21/6218 |
| 2005/0027733 | A1 | * | 2/2005 | Donahue ............. | G06F 17/2264 |
| 2005/0240596 | A1 | * | 10/2005 | Worthen ........... | G06Q 30/0257 |
| 2007/0159304 | A1 | * | 7/2007 | Agarwal .............. | G06K 7/0008 340/10.32 |
| 2009/0162822 | A1 | * | 6/2009 | Strachan .................. | G09B 7/00 434/309 |
| 2010/0169778 | A1 | * | 7/2010 | Mundy ............... | G06F 16/9577 715/716 |
| 2010/0274769 | A1 | * | 10/2010 | Hazlewood ............. | G06F 16/10 707/679 |
| 2011/0191363 | A1 | * | 8/2011 | Bell ........................ | G06F 17/21 707/767 |
| 2014/0213220 | A1 | * | 7/2014 | Huber ................... | H04L 63/101 455/411 |

* cited by examiner

*Primary Examiner* — Eliyah S. Harper
(74) *Attorney, Agent, or Firm* — Van Pelt, Yi & James LLP

(57) ABSTRACT

A system for data storage for distributed access comprises a tool determiner and a tool interface. The tool determiner is for determining a tool for storing tagged data based at least in part on the tagged data. The tool comprises one of the following: an object tool, a file tool, or a database tool. The tool interface is for providing the tagged data, an access list, and one or more sharing locations to the tool. The tool stores the tagged data at each of the sharing locations.

20 Claims, 10 Drawing Sheets

SYSTEM FOR DATA STORAGE FOR DISTRIBUTED ACCESS

BACKGROUND OF THE INVENTION

Large companies typically own a data storage center at each of their business locations, often distributed around the world. Data created at a business location is stored in the local data storage center and is accessible to anyone within the company. A user at a primary business location attempting to access data at a secondary business location at a point hundreds or thousands of miles away may face a great deal of delay. Synchronizing data between business locations is possible, however the overhead of synchronizing all data between business locations is unnecessarily burdensome.

BRIEF DESCRIPTION OF THE DRAWINGS

Various embodiments of the invention are disclosed in the following detailed description and the accompanying drawings.

DETAILED DESCRIPTION

Figure 1:
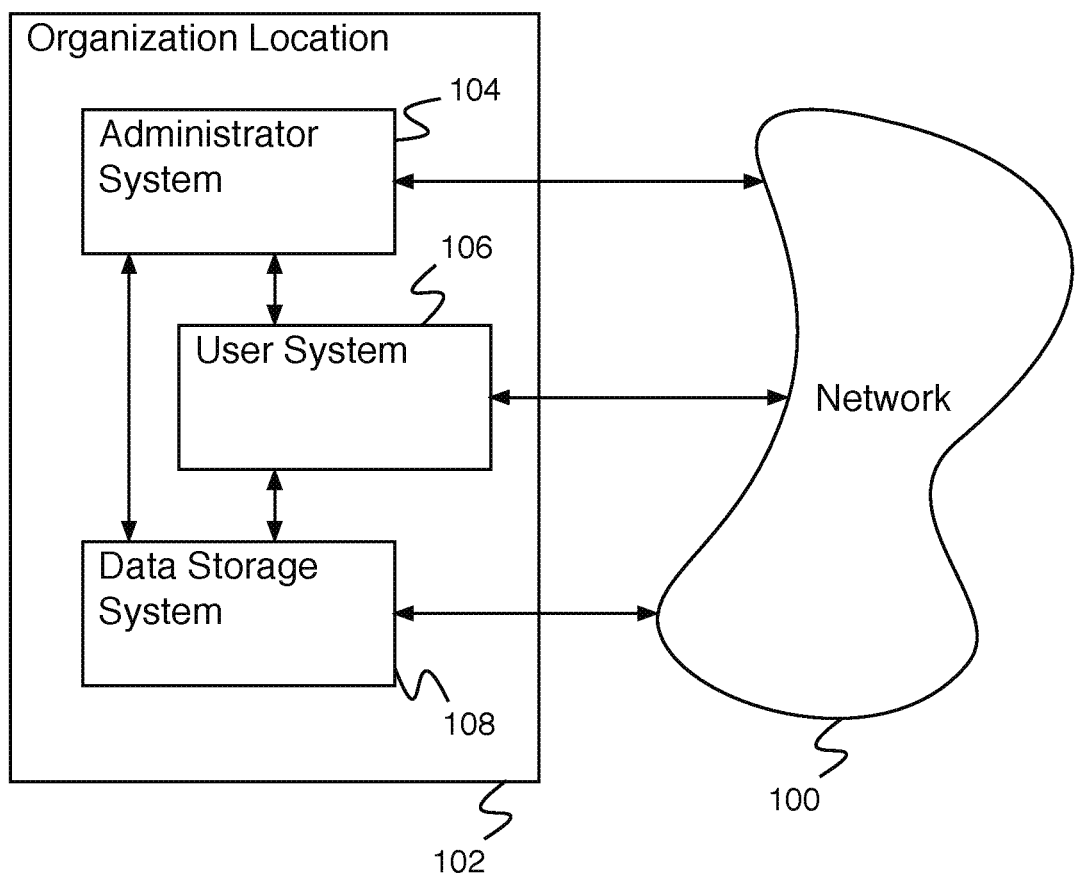
FIG. 1 is a block diagram illustrating an example of an embodiment of a networked system.

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A system for data storage for distributed access is disclosed. The system for data storage for distributed access comprises a tool determiner for determining a tool for storing tagged data based at least in part on the tagged data, wherein the tool comprises one of the following: an object tool, a file tool, or a database tool, and a tool interface for providing the tagged data, an access list, and one or more sharing locations to the tool, wherein the tool stores the tagged data at each of the sharing locations.

In some embodiments, the tool provides access to the data for the resources in the access list. In some embodiments, a user comprises a user or system resource, because in some cases the user comprises an automated system creating the request for sharing data across locations and access is given to other users/system resources to access the shared data.

In some embodiments, the data is shared across multiple locations and should always be accessed locally in the event that the data is available locally. For example, the data tagged to be shared at different locations and based on the locality of the user/system resource that requests access to the data, the data is accessed locally or in the event the data is not available locally, then the data is accessed remotely. In the event that there are any issues with local availability (e.g., the data storage being unavailable), then the distributed access system automatically transfers the request to store and retrieve data to another available system that is as local as possible to the user/system resource. In various embodiments, "as local as possible" is based at least in part on metrics such as one or more of the following: geotagging, latency, load, or any other appropriate metric.

In some embodiments, the system for data storage for distributed access selectively distributes data from a local storage to one or more sharing locations. A system or system user identifies and tags data to distribute and indicates one or more sharing locations for distributing the data. The system then determines a tool for storing the tagged data based at least in part on the tagged data. The tool associated with the tagged data comprises a specialized tool for sharing data, which maintains distributed copies (e.g., synchronizes the distributed copies of data) that are accessible by the users/resources listed in the access list. In some embodiments, the system determines the tool for storing the tagged data based on the data type. In some embodiments, the system selects from an object tool, a file tool, and a database tool. After selecting the tool, the system provides the tagged data, an access list, the privileges associated with each user/resource on the access list, and/or one or more sharing locations to the tool. The system packages and translates the tagged data, the access list, the privilege(s), and/or one or more sharing locations to the tool appropriately for the format, order, and appropriate input schema/structure required by the selected tool. In some embodiments, a default privilege is associated with a user/resource in the event privilege(s) is/are not provided associated with a given user/resource.

In some embodiments, the distributed storage is automatically tiered. Tiered storage systems have subsets of the data stored at number of different levels (e.g., a higher tier with faster access—for example, stored in solid state memory, a lower tier with slower access—for example, stored in a magnetic memory, etc.). In a distributed storage system, the data should be available at the same level at the distributed locations. For example, in the event that the data is being frequently accessed at any of the locations, then the data is automatically stored in a higher tier or promoted to a higher tier from a lower tier (e.g., with faster access in the higher tier than in the lower tier) at all the locations. In the event that the data is seldom accessed, then the data is automatically stored in a lower tier or demoted to a lower tier from a higher tier at all the locations. In some embodiments, the data stored at all locations is monitored to determine whether the data is being stored at the appropriate level.

In some embodiments, indications are sent between locations to synchronize data stored and the tiers that the data is stored in. For example, updates or original data is sent from one storage location to another storage location along with information to be able to synchronize the data at each location.

In some embodiments, there is a manual override that enables a user to set the tier level (e.g., higher tier, lower tier, etc.) for all locations for a given data stored in one or multiple locations, and also for a given data stored in a given location, so that different tiers can be used for different locations. In some embodiments, there are multiple tiers (e.g., 1 to N where each higher level has higher access—for example, faster speeds, compared to the level below it).

In some embodiments, a monitoring tool monitors frequency of data use and stores data in multiple tiers according to rules set in the system. The multiple data tiers are synchronized to be the same tiers used for the same synchronized data across all sharing locations.

FIG. 1 is a block diagram illustrating an example of an embodiment of a networked system. In some embodiments, the network system of FIG. 1 comprises a system for an organization location communicating with a network. In some embodiments, the system of FIG. 1 comprises a system for data storage for distributed access. In the example shown, the systems of organization location 102 are in communication with each other and with network 100. Organization location 102 comprises administrator system 104, user system 106, and data storage system 108. In various embodiments, the systems of organization location 102 are in communication with each other via a wired network, a wireless network, a cellular network, a location network, a remote network, network 100, the Internet, or any other appropriate network or combination of networks. In some embodiments, the systems of organization locations communicate with other systems via network 100. In various embodiments, other systems comprise other organization locations of the same organization, organization locations of different organizations, network users, network servers, or any other appropriate computing systems. In some embodiments, administrator system 104 comprises a system accessed by an administrator for maintaining user system 106 and data storage system 108. In some embodiments, user system 106 comprises a system for use by a computing system user. In various embodiments, user system 106 comprises a system for creating data, for indicating to store data on data storage system 108, for indicating to share data with other data storage systems, retrieving and presenting data or for any other appropriate purpose. In some embodiments, administrator system 104, user system 106, and data storage system 108 are in physical proximity (e.g., in the same room, in the same building, in buildings on the same campus, etc.) to enable timely (e.g., sufficiently rapid) access of data stored in data storage system 108 by user system 106. In various embodiments, the processors comprising administrator system 104, user system 106, and data storage system 108 comprise any one of a variety of proprietary or commercially available single or multi-processor systems (e.g., an Intel-based processor) or other type of commercially available processor able to support communications in accordance with each particular embodiment and application. In various embodiments, organization location 102 comprises any appropriate number of administrator systems (e.g., 1 administrator system, 3 administrator systems, 22 administrator systems, etc.), any appropriate number of user systems (e.g., 1 user system, 4 user systems, 253 user systems, etc.), and any appropriate number of data storage systems (e.g., 1 data storage system, 2 data storage systems, 48 data storage systems, etc.).

Figure 2:
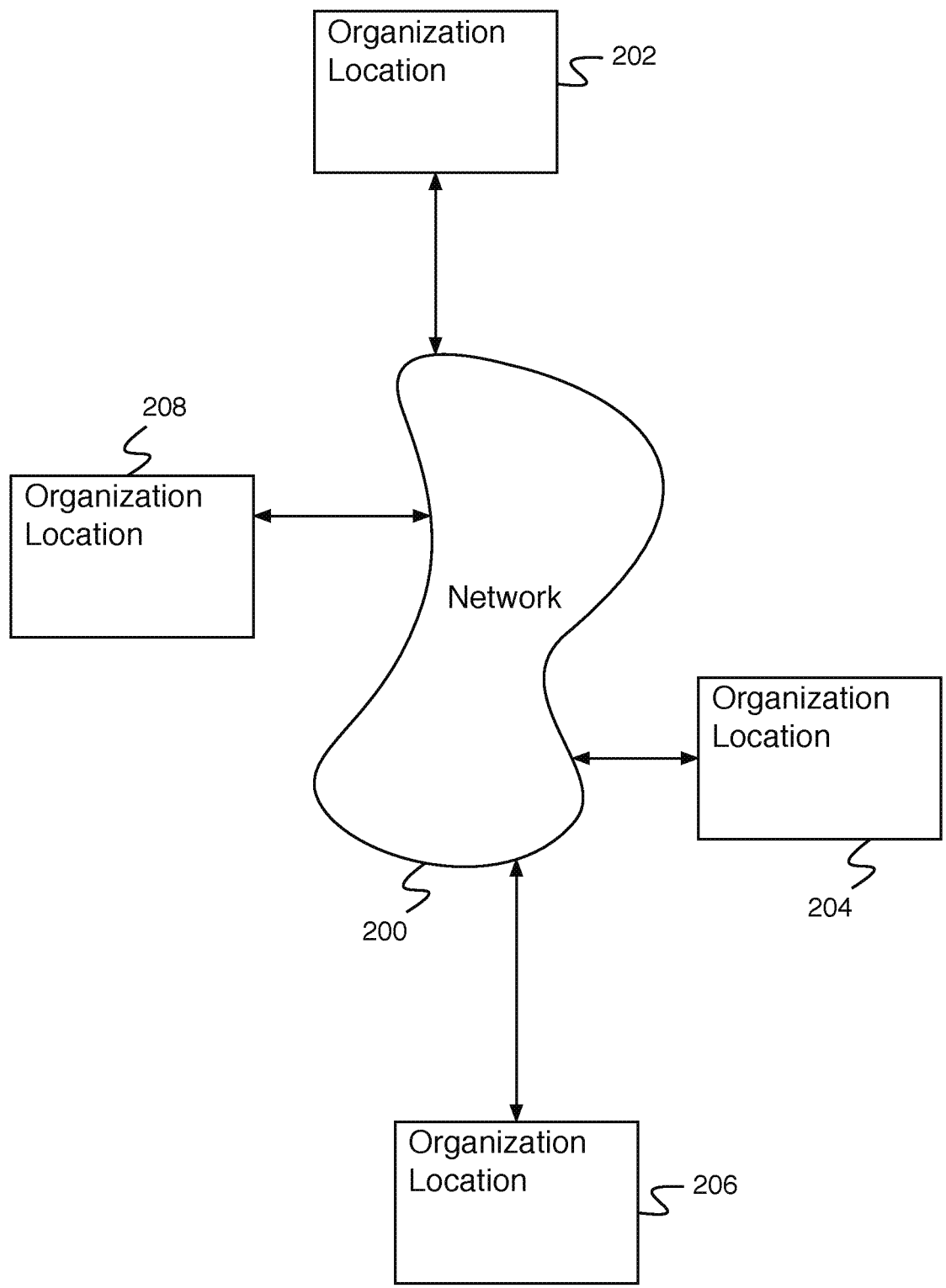
FIG. 2 is a block diagram illustrating an example of an embodiment of a networked system.

FIG. 2 is a block diagram illustrating an example of an embodiment of a networked system. In some embodiments, network 200 comprises network 100 of FIG. 1. In some embodiments, one or more organization locations of FIG. 2 (e.g., organization location 202, organization location 204, organization location 206, and organization location 208) each comprise an organization location as in organization location 102 of FIG. 1. In various embodiments, organization location 202, organization location 204, organization location 206, and organization location 208 are in physical proximity to one another (e.g., in the same building, in the same room, etc.) or are physically remote from one another (e.g., in separate locations of an organization, at separate offices of a collaboration between organizations, in separate countries, on separate continents, etc.). In some embodiments, data is created at one or more organization location. In some embodiments, data is shared between organization locations (e.g., a user using a user system at a first organization location is able to access data stored in data storage at a second organization location). In some embodiments, data is distributed between organization locations (e.g., using a system or a tool that efficiently enables local synchronized data storage in a distributed manner). In some embodiments, distributing data between organization locations comprises copying data from data storage at a first organization location to data storage at a second organization location (e.g., data generated and stored at a first location is copied and made accessible at one or more other locations for local access at or near the one or more other locations). In some embodiments, in the event two organization locations are a significant distance apart (e.g., hundreds or thousands of miles), sharing data between the two organization locations is prohibitively slow. Data created at a first organization location that is desired to be used at a second organization location is distributed to be stored at the second organization location in addition to the first organization location. In some embodiments, a user using a user system at a first organization location indicates that data should be distributed to be stored at a second organization location.

Figure 3:
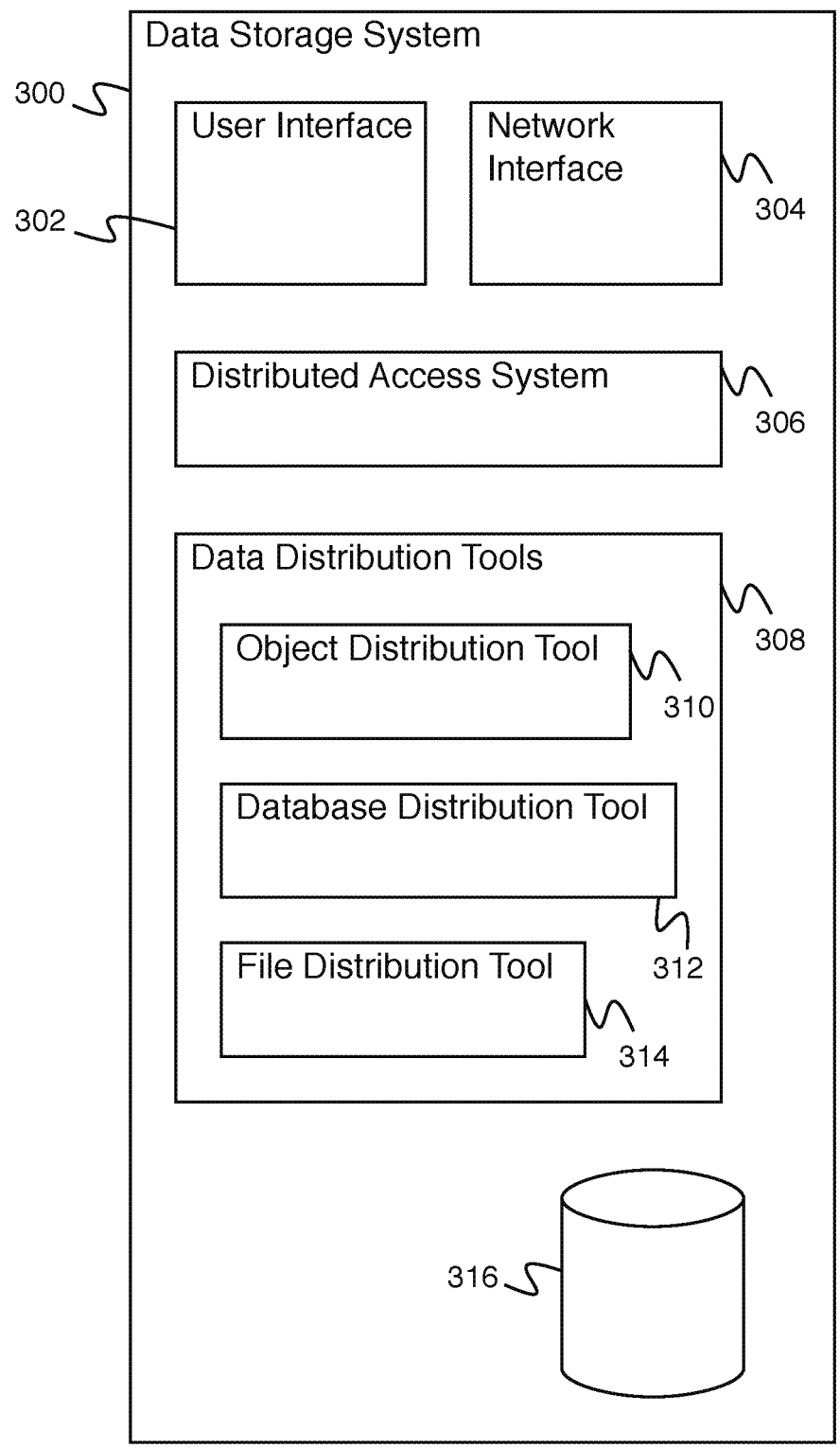
FIG. 3 is a block diagram illustrating an example of an embodiment of a data storage system.

FIG. 3 is a block diagram illustrating an example of an embodiment of a data storage system. In some embodiments, data storage system 300 of FIG. 3 comprises data storage system 108 of FIG. 1. In the example shown, data storage system 300 comprises a system for storing, retrieving, and distributing data. Data storage system 300 comprises user interface 302 for communicating with a user and network interface 304 for communicating with a network. In various embodiments, user interface 302 comprises a user interface for a user to directly operate data storage system 300, an interface for data storage system to interact with a user system (e.g., a cable, a wireless connection, etc.), a network connection for interacting with a user system, an application program interface (API), or any other appropriate user interface. Network interface 304 comprises a network interface for communicating with other systems (e.g., other data storage systems, systems located at other organization locations, etc.) via a network. Distributed access system 306 comprises a system for distributing access to data. In various embodiments, distributed access system 306 comprises a system for receiving an indication to distribute data (e.g., from a user via user interface 302), for tagging data stored within data storage system 300 (e.g., in data storage 316) as data for distributing, for selecting a tool (e.g., from data distribution tools 308) for distributing data, or for any other appropriate purpose. In various embodiments, distributed access system 306 comprises a tool for providing tagged data to a data distribution tool, for providing an access list to a data distribution tool, for providing sharing locations to a data distribution tool, for packaging and translating communication with a distribution tool, for tracking or indexing which data is distributed with which tool, or for providing any other appropriate information to a data distribution tool. Data distribution tools 308 comprise a set of data distribution tools. In the example shown, data distribution tools 308 comprises object distribution tool 310, database distribution tool 312, and file distribution tool 314. In some embodiments, object distribution tool 310 comprises a software tool for distributing data that is optimized for object data (e.g., objects comprising data, methods, metadata, and relations to other objects). In some embodiments, database distribution tool 312 comprises a software tool for distributing data that is optimized for database data (e.g., databases, parts of databases, tables, parts of tables, etc.). In some embodiments, file distribution tool 314 comprises a software tool for distributing data that is designed to work with any type of file data. Data storage system 300 additionally comprises data storage 316 for storing data. In some embodiments, when data stored in data storage 316 is tagged for distribution, it is distributed to a remote data storage system (e.g., using a data distribution tool—for example, a data distribution tool of data distribution tools 308). In some embodiments, when tagged data stored in data storage 316 is modified (e.g., after a local write) it is synchronized to a remote data storage system (e.g., to each of one or more sharing locations) using a data distribution tool (e.g., a data distribution tool of data distribution tools 308). In various embodiments, an index is maintained by each tool indicating the data distributed by the tool to different distributed storage sites, the access system indexes the data and which tool it is associated with, or any other appropriate manner of tracking or indexing data distributed.

Figure 4:
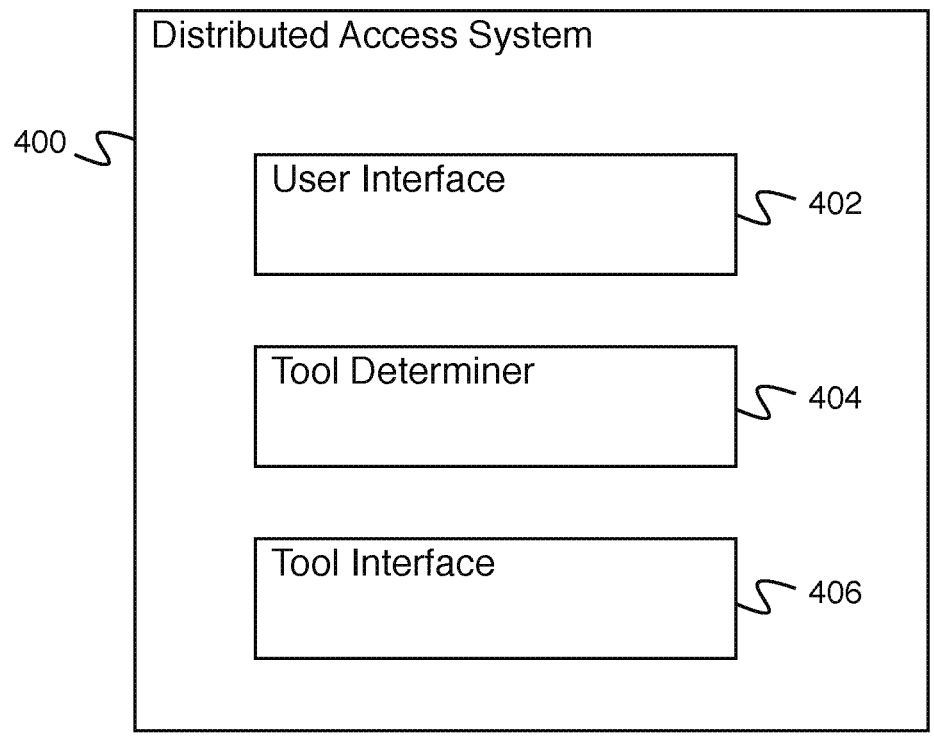
FIG. 4 is a block diagram illustrating an example of an embodiment of a distributed access system.

FIG. 4 is a block diagram illustrating an example of an embodiment of a distributed access system. In some embodiments, distributed access system 400 comprises distributed access system 306 of FIG. 3. In the example shown, distributed access system 400 comprises user interface 402. In some embodiments, user interface 402 comprises a user interface for receiving data from a data storage system user interface (e.g., user interface 302 of FIG. 3). In various embodiments, user interface 402 comprises a user interface for receiving a request to distribute access, for receiving a request to access tagged data, or for receiving any other appropriate user request. In various embodiments, a request to distribute access comprises tagged data, an access list (e.g., a user list), privileges associated with a user of the access list, sharing locations, or any other appropriate access distribution information. Distributed access system 400 additionally comprises tool determiner 404. In some embodiments, tool determiner 404 comprises a tool determiner for determining a tool (e.g., a tool of data distribution tools 308 of FIG. 3) for storing tagged data based at least in part on the tagged data, wherein the tool comprises one of the following: an object tool, a file tool, or a database tool. In some embodiments, tool determiner 404 is further for determining a tool for accessing the tagged data based at least in part on the tagged data (e.g., using an index to determine an associated tool to access a desired/selected data). Distributed access system 400 additionally comprises tool interface 406. In some embodiments, tool interface 406 comprises a tool interface for providing the tagged data, an access list, privilege(s) associated with the access list, and one or more sharing locations to the tool, wherein the tool stores the tagged data at each of the sharing locations. In some embodiments, tool interface 406 is further for providing the request to access the tagged data to the tool for accessing the tagged data. In some embodiments, tool interface 406 is further for receiving a request response from the tool for accessing the tagged data.

Figure 5:
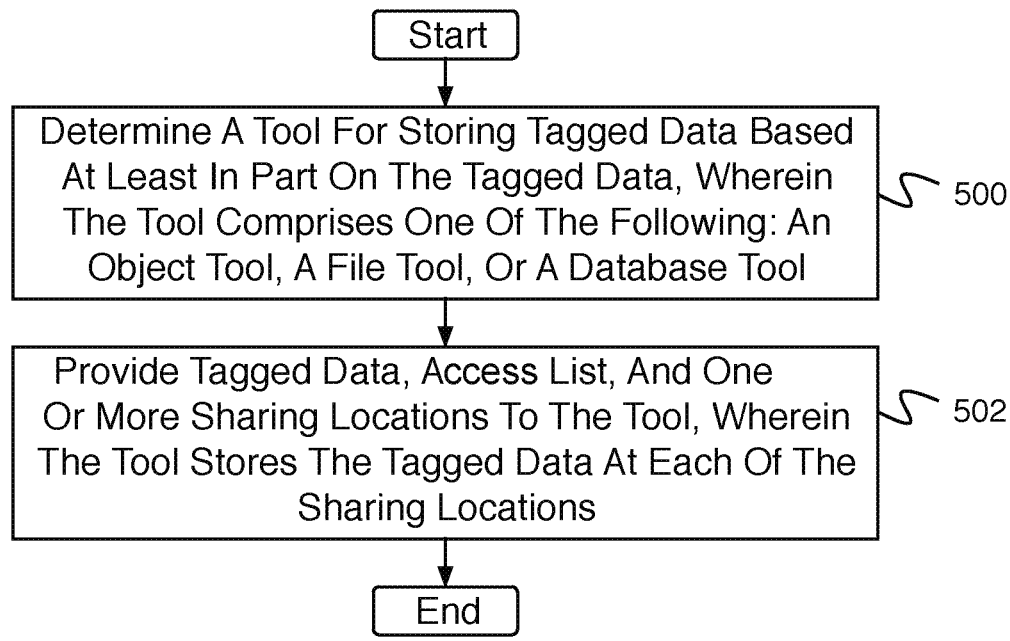
FIG. 5 is a flow diagram illustrating an example of an embodiment of a process for a system for data storage for distributed access.

FIG. 5 is a flow diagram illustrating an example of an embodiment of a process for a system for data storage for distributed access. In some embodiments, the process of FIG. 5 is executed by distributed access system 400 of FIG. 4. In the example shown, in operation 500, a tool is determined for storing tagged data based at least in part on the tagged data, wherein the tool comprises one of the following: an object tool, a file tool, or a database tool. In operation 502, the tagged data, an access list, and one or more sharing locations are provided to the tool, wherein the tool stores the tagged data at each of the sharing locations. In some embodiments, one or more privileges is/are provided to the tool. In various embodiments, the one or more privileges comprise one or more of the following; read access, write access, modify access, delete access, copy access, or any other appropriate access.

Figure 6:
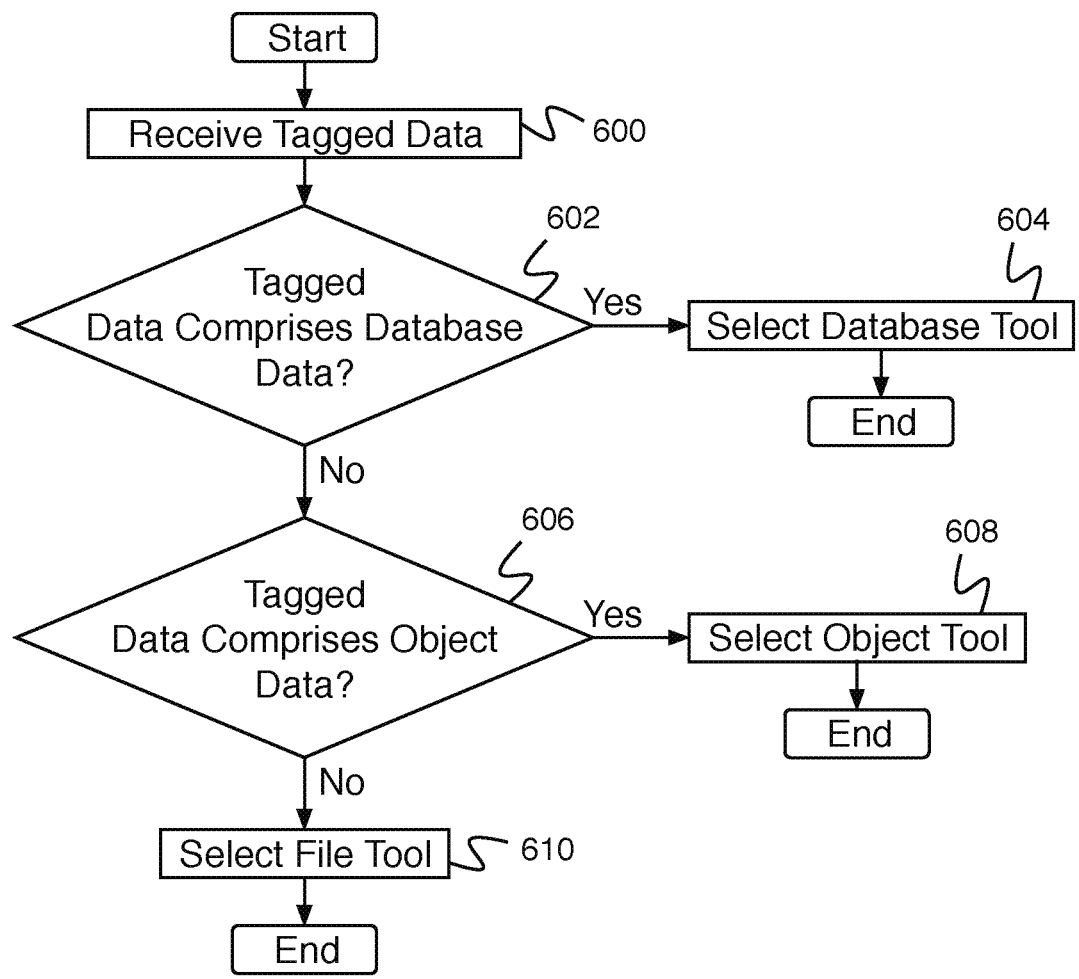
FIG. 6 is a flow diagram illustrating an example of an embodiment of a process for determining a tool for storing tagged data.

FIG. 6 is a flow diagram illustrating an example of an embodiment of a process for determining a tool for storing tagged data. In some embodiments, the process of FIG. 6 implements operation 500 of FIG. 5. In the example shown, in operation 600, tagged data is received. For example, a user indicates to tag data and the tagged data or the indication of the tagged data is received (e.g., from a data storage). In some embodiments, the indication of data to tag is received from a user system. In some embodiments, information describing tagged data is received (e.g., from a user system, from a data storage, etc.). In operation 602, it is determined whether the tagged data comprises database data. For example, it is determined that the tagged data comprises database data in the event that the tagged data comprises a database or a part of a database. In some embodiments, it is determined that the tagged data comprises database data in the event that the tagged data comprises a table or a part of a table. In the event it is determined that the tagged data does not comprise database data, control passes to operation 606. In the event it is determined that the tagged data comprises database data, control passes to operation 604. In operation 604, the database tool is selected, and the process ends. In operation 606, it is determined whether the tagged data comprises object data. For example, it is determined that the tagged data comprises object data in the event that the tagged data comprises a set of objects including relations connecting the objects to one another. In some embodiments, it is determined that the tagged data comprises object data in the event that the tagged data comprises data stored without using a table (e.g., using a hash, a set of identifiers, etc.). In the event it is determined that the tagged data does not comprise object data, control passes to operation 610. In the event it is determined that the tagged data comprises object data, control passes to operation 608. In operation 608, the object tool is selected, and the process ends. In operation 610, the file tool is selected, and the process ends.

Figure 7A:
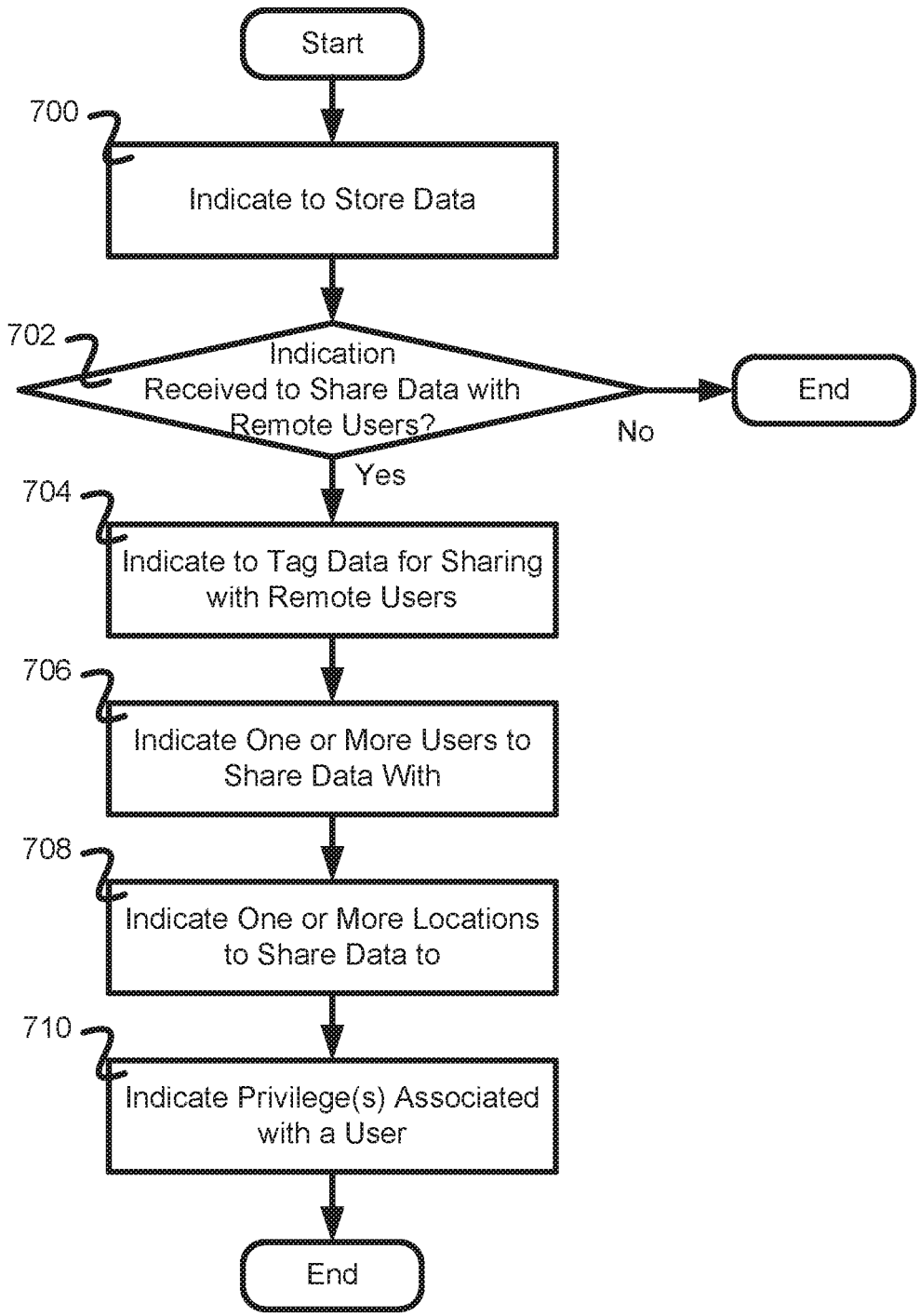
FIG. 7A is a flow diagram illustrating an example of an embodiment of a process for a user system associated with a distributed access system.

FIG. 7A is a flow diagram illustrating an example of an embodiment of a process for a user system associated with a distributed access system. In some embodiments, the process of FIG. 7A is executed by a user using a user system (e.g., user system 106 of FIG. 1) in communication with a data storage system comprising a distributed access system (e.g., data storage system 300 of FIG. 3). In the example shown, in operation 700, it is indicated to store data. For example, the user indicates to store data (e.g., in a data storage). In operation 702, it is determined whether an indication was received to share data with a remote user. For example, the user indicates whether to share data with remote users to the user system. In the event the indication is received to share the data with remote users, the process ends. In the event the indication is received to share the data with remote users, control passes to operation 704. In operation 704, it is indicated to tag the data for sharing with remote users. In operation 706, one or more users to share the data with is indicated. In operation 708, one or more locations to share the data is indicated. In operation 710, privilege(s) associated with a user is/are indicated. In various embodiments, the one or more privileges comprise one or more of the following; read access, write access, modify access, delete access, copy access, or any other appropriate access.

Figure 7B:
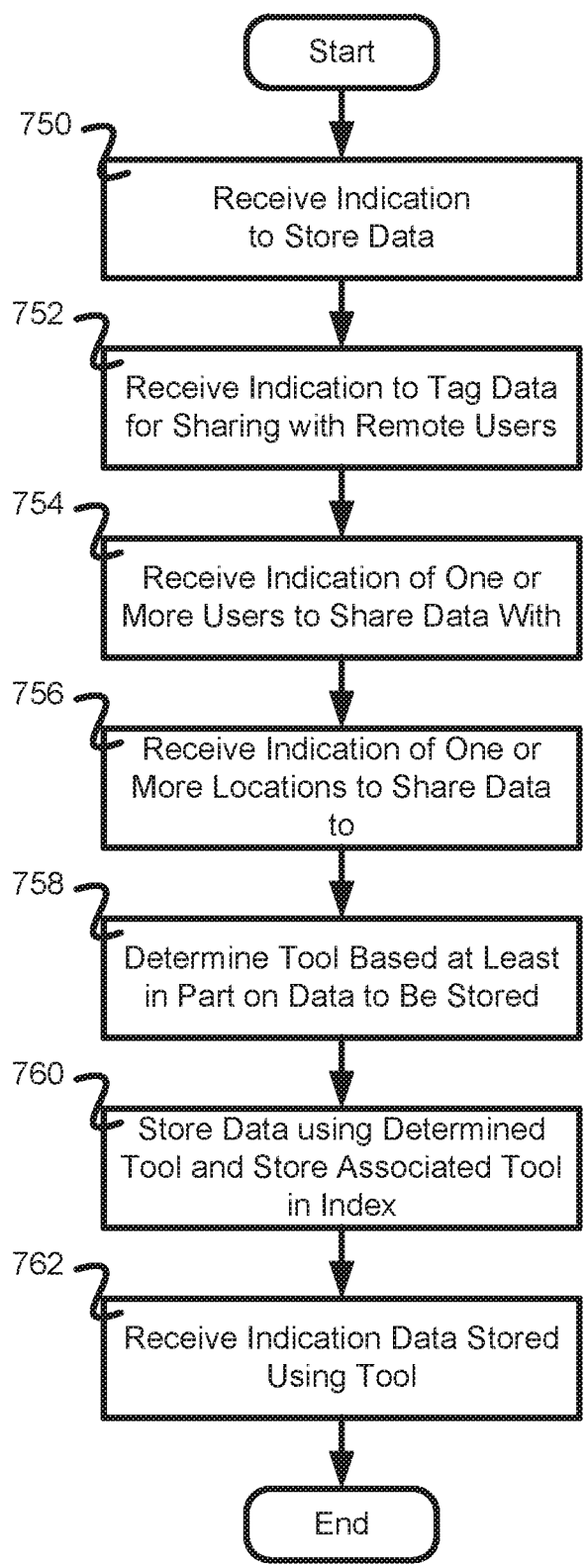
FIG. 7B is a flow diagram illustrating an example of an embodiment of a process for a distributed access system.

FIG. 7B is a flow diagram illustrating an example of an embodiment of a process for a distributed access system. In some embodiments, the process of FIG. 7B is executed by a distributed access system (e.g., distributed access system 306 of FIG. 3). In the example shown, in operation 750, an indication is received to store data. In operation 752, an indication is received to tag data for sharing with remote users. For example, an indication is received from a user to tag a data that is or was stored to be tagged, where the tagging indicates to share the data with other users such that the data is copied to other locations so that a local copy can be accessed locally by a remote user. In operation 754, an indication is received of one or more users to share data with. For example, the one or more users are enabled to share the data at any locations the data is stored. In operation 756, an indication is received of one or more locations to share data. For example, an indication is received of one or more locations that shared data is to be stored so that each local user to the one or more locations accesses a local copy of the shared data. In 758, a tool is determined based at least in part on data to be stored. For example, a database tool, an object tool, or a file tool is selected to be used to store data based on the data to be stored (e.g., using type of data). In 760, data is stored using determined tool and the tool is stored in an index. For example, an indication of the tool is stored associated with the data stored so that future access to the data can be made using the indicated tool. In 762, an indication is received of the data stored using the tool.

Figure 8:
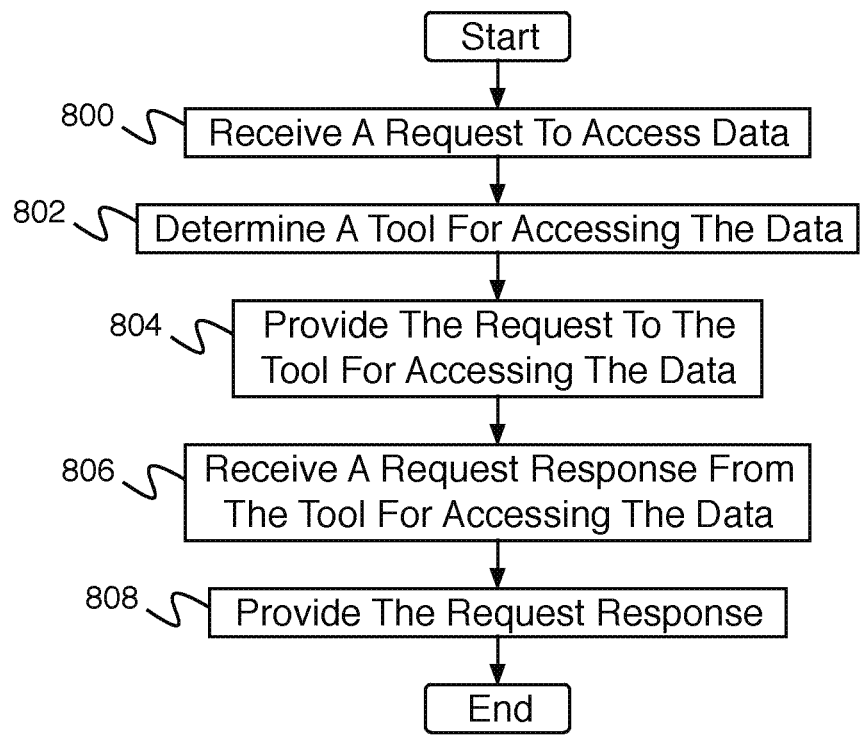
FIG. 8 is a flow diagram illustrating an example of an embodiment of a process for accessing data.

FIG. 8 is a flow diagram illustrating an example of an embodiment of a process for accessing data. In some embodiments, the process of FIG. 8 is executed by distributed access system 400 of FIG. 4. In the example shown, in operation 800, a request to access data is received. For example, a request to access data is received from a user system (e.g., being operated by a user). In some embodiments, a check is made to determine whether the user using the user system has privilege to access the data associated with the request. In some embodiments, the privilege associated with a user is stored associated with the tool to access the data. In operation 802, a tool for accessing the data is determined. For example, the tool for accessing the data is determined based at least in part on the data. In some embodiments, an index is used to determine an appropriate tool associated with the data requested. In some embodiments, the tool for accessing the data is determined based at least in part on information describing the data. In some embodiments, the tool for accessing the data is determined using the process of FIG. 6. In operation 804, the request is provided to the tool for accessing the data. In various embodiments, the request comprises the tagged data, user information, the data location, or any other appropriate request information. In operation 806, a request response is received from the tool for accessing the data. In various embodiments, the request response comprises the data, an indication that the data could not be found, an indication that user permissions are not suitable for accessing the data, an indication of a data location for accessing by the user, or any other appropriate request response. In operation 808, the request response is provided. In some embodiments, the request response is provided to the user (e.g., via a user system).

Figure 9:
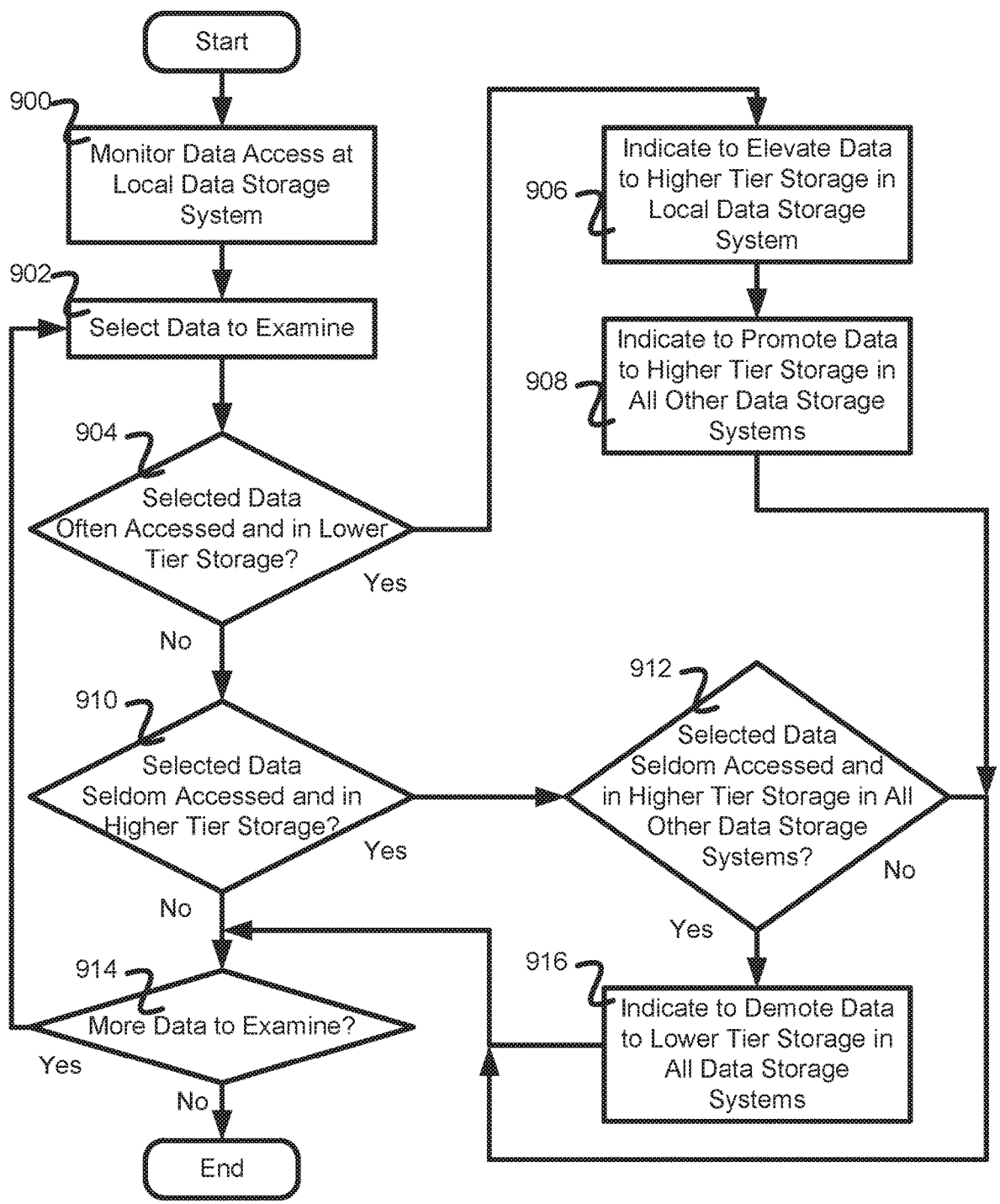
FIG. 9 is a flow diagram illustrating an embodiment of tiered distributed storage.

FIG. 9 is a flow diagram illustrating an embodiment of tiered distributed storage. In some embodiments, the process of FIG. 9 is executed by distributed access system 400 of FIG. 4. In the example shown, in operation 900 data access is monitored at a local data storage system. For example, the data in the tiered storage is monitored by a monitoring tool to see how often it is accessed. In operation 902, data is selected to examine. In operation 904, it is determined whether the selected data is accessed often and is in lower tier storage. In the event that the selected data is not accessed often and is not in lower tier storage, then control passes to operation 910. In the event that the selected data is accessed often and is in lower tier storage, then in operation 906 it is indicated to elevate data to higher tier storage in the local data storage system and in operation 908 it is indicated to promote data to higher tier storage in all other data storage systems and control passes to operation 914.

In operation 910, it is determined whether selected data is seldom accessed and is in a higher tier storage. In the event that selected data is not seldom accessed and is not in a higher tier storage, then control passes to 914. In the event that selected data is seldom accessed and is in a higher tier storage, then in operation 912 it is determined whether selected data is seldom accessed and is in a higher tier storage in all other data storage systems. In the event that selected data is seldom accessed and is in a higher tier storage in all other data storage systems, then in operation 916 it is indicated to demote data to lower tier storage in all data storage systems. In the event that selected data is not seldom accessed and is not in a higher tier storage in all other storage system, then control passes to operation 914.

In operation 914, it is determined whether there is more data to examine. In the event that there is more data to examine, control passes to operation 902. In the event that there is no more data to examine, the process ends.

In some embodiments, tier levels comprise a set of tiers (e.g., High/Medium-High/Medium/Medium-Low/Low; Hot/Warm/Cold; Fast/Normal/Slow; etc.).

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system for data storage for distributed access, comprising:
    an interface configured for receiving a request to distribute access of tagged data; and
    a processor configured for:
        determining a data distribution tool for storing the tagged data, comprising:
            determining whether the tagged data comprises database data;
            in response to the tagged data comprising database data, selecting a database tool as the data distribution tool;
            in response to the tagged data not comprising database data, determining whether the tagged data comprises object data;
            in response to the tagged data comprising object data, selecting an object tool as the data distribution tool; and
            in response to the tagged data not comprising object data, selecting a file tool as the data distribution tool;
        providing the tagged data, an access list, a privilege associated with a user of the access list, and one or more sharing locations to the data distribution tool, wherein the data distribution tool stores the tagged data at each of the one or more sharing locations; and
        updating an index to indicate the data distribution tool associated with the tagged data.

2. A system as in claim 1, wherein the request to distribute access comprises the tagged data.

3. A system as in claim 1, wherein the request to distribute access comprises the access list.

4. A system as in claim 1, wherein the request to distribute access comprises the privilege associated with the user of the access list.

5. A system as in claim 1, wherein the request to distribute access comprises the one or more sharing locations.

6. A system as in claim 1, further comprising an interface for receiving a request to access the tagged data.

7. A system as in claim 6, wherein the data distribution tool for storing the tagged data is a first data distribution tool, wherein the processor is further configured for determining a second data distribution tool for accessing the tagged data based at least in part on the tagged data.

8. A system as in claim 7, wherein the processor is further configured for providing the request to access the tagged data to the second data distribution tool for accessing the tagged data.

9. A system as in claim 8, wherein the processor is further configured for receiving a request response from the second data distribution tool for accessing the tagged data.

10. A system as in claim 7, wherein determining the second data distribution tool for accessing the tagged data is based at least in part on the index, wherein the index comprises the indication of the data distribution tool associated with the tagged data.

11. A system as in claim 1, wherein the database tool comprises a tool for distributing tables or pieces of databases.

12. A system as in claim 1, wherein the object tool comprises a tool for distributing object data.

13. A system as in claim 1, wherein the file tool comprises a tool for sharing files.

14. A system as in claim 7, wherein the second data distribution tool for accessing the tagged data checks access permissions.

15. A system as in claim 7, wherein the second data distribution tool for accessing the tagged data determines one or more locations to access.

16. A system as in claim 1, wherein the data distribution tool for storing tagged data synchronizes copies at each of the one or more sharing locations after a local write.

17. A system as in claim 1, wherein the data distribution tool comprises a monitoring tool that determines that a stored data is often accessed and in a lower data storage tier and automatically promotes the stored data to a higher data storage tier in the one or more sharing locations.

18. A process for data storage for distributed access, comprising:
    receiving a request to distribute access of tagged data;
    determining, using a processor, a data distribution tool for storing tagged data, comprising:
        determining whether the tagged data comprises database data;
        in response to the tagged data comprising database data, selecting a database tool as the data distribution tool;
        in response to the tagged data not comprising database data, determining whether the tagged data comprises object data;
        in response to the tagged data comprising object data, selecting an object tool as the data distribution tool; and
        in response to the tagged data not comprising object data, selecting a file tool as the data distribution tool;
    providing the tagged data, an access list, a privilege associated with a user of the access list, and one or more sharing locations to the tool, wherein the data distribution tool stores the tagged data at each of the sharing locations; and
    updating an index to indicate the data distribution tool associated with the tagged data.

19. A non-transitory computer readable storage medium for data storage for distributed access, comprising computer instructions for:
    receiving a request to distribute access of tagged data;
    determining a data distribution tool for storing tagged data, comprising:
        determining whether the tagged data comprises database data;
        in response to the tagged data comprising database data, selecting a database tool as the data distribution tool;
        in response to the tagged data not comprising database data, determining whether the tagged data comprises object data;
        in response to the tagged data comprising object data, selecting an object tool as the data distribution tool; and
        in response to the tagged data not comprising object data, selecting a file tool as the data distribution tool;
    providing the tagged data, an access list, a privilege associated with a user of the access list, and one or more sharing locations to the tool, wherein the data distribution tool stores the tagged data at each of the sharing locations; and
    updating an index to indicate the data distribution tool associated with the tagged data.

20. A system as in claim 7, wherein the first data distribution tool and the second data distribution tool are the same tool.

\* \* \* \* \*